United States Patent
Griffiths et al.

(10) Patent No.: US 9,657,590 B2
(45) Date of Patent: May 23, 2017

(54) AIRCRAFT ENGINE CLEANING SYSTEM

(71) Applicant: Rolls-Royce Corporation, Indianapolis, IN (US)

(72) Inventors: George F. Griffiths, Southlake, TX (US); Prahlad R. D. Heggere, Carmel, IN (US); Jeffrey A. Green, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 86 days.

(21) Appl. No.: 14/749,252

(22) Filed: Jun. 24, 2015

(65) Prior Publication Data

US 2016/0032761 A1    Feb. 4, 2016

Related U.S. Application Data

(60) Provisional application No. 62/032,751, filed on Aug. 4, 2014.

(51) Int. Cl.
| | | |
|---|---|---|
| *B08B 3/00* | (2006.01) | |
| *F01D 25/00* | (2006.01) | |
| *B64D 27/10* | (2006.01) | |
| *B64D 13/02* | (2006.01) | |
| *B64F 5/30* | (2017.01) | |

(52) U.S. Cl.
CPC .......... *F01D 25/002* (2013.01); *B64D 13/02* (2013.01); *B64D 27/10* (2013.01); *B64F 5/30* (2017.01); *F05D 2220/32* (2013.01)

(58) Field of Classification Search
CPC . F01D 25/002; F02C 3/04; F02C 9/18; B64D 27/10; B64D 13/02; F05D 2220/32; F05D 2240/35; B64F 5/30

USPC ......... 123/56 R, 123; 244/53 R; 60/783, 785
See application file for complete search history.

(56) References Cited

U.S. PATENT DOCUMENTS

| | | | |
|---|---|---|---|
| 3,623,668 | A | 11/1971 | Freid et al. |
| 5,679,174 | A | 10/1997 | Buongiorno |
| 6,478,033 | B1 | 11/2002 | Foster |
| 6,659,715 | B2 | 12/2003 | Kuesters et al. |

(Continued)

FOREIGN PATENT DOCUMENTS

| | | |
|---|---|---|
| EP | 2492199 A2 | 8/2012 |
| WO | 2005077554 A1 | 8/2005 |

(Continued)

OTHER PUBLICATIONS

Extended European Search Report for Application No. 15174310.1-1754, dated Dec. 21, 2015, 7 pages.

*Primary Examiner* — Eric Golightly
(74) *Attorney, Agent, or Firm* — Barnes & Thornburg, LLP

(57) ABSTRACT

An aircraft comprising a cabin air system, a gas turbine engine including an engine core coupled to the cabin air system to provide compressed bleed air to the cabin air system and a cleaning agent supply connector coupled to the engine core to conduct a cleaning agent to the engine core, and a pneumatic coupling system including a first valve coupled between the cabin air system and the engine core, a second valve coupled between the engine core and the cleaning agent supply connector, and a controller coupled to the first valve, the controller configured to automatically close the first valve and block compressed bleed air that may contain cleaning agent moving through the engine core from moving into the cabin air system in response to receipt of an input associated with a cleaning cycle.

16 Claims, 3 Drawing Sheets

(56) References Cited

U.S. PATENT DOCUMENTS

| | | |
|---|---|---|
| 7,033,135 B2 | 4/2006 | Mortzheim et al. |
| 7,033,979 B2 | 4/2006 | Herwig et al. |
| 8,245,952 B2 | 8/2012 | de la Bruère-Terreault et al. |
| 8,303,243 B2 | 11/2012 | Fish et al. |
| 8,337,630 B2 | 12/2012 | de la Bruère-Terreault et al. |
| 8,479,754 B2 | 7/2013 | Hjerpe |
| 8,523,514 B2 | 9/2013 | Eastwood et al. |
| 2014/0144151 A1 | 5/2014 | Bifulco |
| 2015/0122292 A1 | 5/2015 | McDermott |

FOREIGN PATENT DOCUMENTS

| | | |
|---|---|---|
| WO | 2013017854 A1 | 2/2013 |
| WO | 2015051146 A1 | 4/2015 |

AIRCRAFT ENGINE CLEANING SYSTEM

CROSS REFERENCE TO RELATED APPLICATIONS

This application claims priority to and the benefit of U.S. Provisional Patent Application No. 62/032,751, filed Aug. 4, 2014, the disclosure of which is now expressly incorporated herein by reference.

FIELD OF THE DISCLOSURE

The present disclosure relates generally to aircraft maintenance, and more specifically to aircraft engine cleaning systems.

BACKGROUND

Aircraft engines, generally gas turbines, are periodically cleaned to remove dirt and grime from internal components of the engine. To clean the engines, water or another cleaning agent is introduced into the engine and the engine is dry motored (rotated without burning fuel) to draw the water over the internal components to be cleaned.

Sometimes, before introducing water into the engine, maintenance crews must take steps to disconnect the engines from other aircraft systems to prevent dirty water moving through the engines from escaping into the other aircraft systems. For example, crews may disconnect air supply systems, fuel manifold systems, anti-ice systems, pressure regulation systems, and/or controller systems before introducing water into the engine. These steps may take an inconvenient amount of time and may be difficult to perform.

Additionally, dry motoring of aircraft engines being cleaned is often driven by an engine starter included in the aircraft. These engine starters are generally limited to constant operation for only a few minutes before they have to be rested to avoid overheating or other damage. Accordingly, cleaning cycles that call for extended periods of dry motoring may take in inconvenient amount of time while the engine starters are rested between uses. The additional time required to cool these systems as well as the maintenance requirements for cleaning can sometimes lead to aircraft operators to defer or to cancel engine cleaning operations.

SUMMARY

The present disclosure may comprise one or more of the following features and combinations thereof.

According to the present disclosure, an aircraft may include a cabin air system and a gas turbine engine. The gas turbine engine may include an engine core coupled to the cabin air system to provide compressed bleed air to the cabin air system and a cleaning agent supply connector coupled to the engine core to conduct a cleaning agent to the engine core.

In some embodiments, the aircraft may also include a pneumatic coupling system. The pneumatic coupling system may include a first valve coupled between the cabin air system and the engine core, a second valve coupled between the engine core and the cleaning agent supply connector, and a controller coupled to the first valve. The controller may be configured to automatically close the first valve and block compressed bleed air that may contain cleaning agent moving through the engine core from moving into the cabin air system in response to receipt of an input associated with a cleaning cycle.

In some embodiments, the controller may be coupled to the cleaning agent supply connector and the cleaning agent supply connector may be configured to send the input associated with a cleaning cycle to the controller in response to a cleaning agent supply being coupled to the cleaning agent supply connector. The controller may be coupled to the second valve and the controller may be configured to automatically open the second valve in response to receipt of the input associated with a cleaning cycle.

In some embodiments, the controller may be coupled to the second valve and the second valve may be configured to send the input associated with a cleaning cycle to the controller in response to movement of the second valve from a closed position to an opened position.

In some embodiments, the pneumatic coupling system may include a user interface coupled to the controller. The user interface may be configured to send the input associated with a cleaning cycle to the controller.

According to another aspect of the present disclosure, an aircraft may include a cabin air system and a gas turbine engine. The gas turbine engine may be coupled to the cabin air system to provide compressed bleed air to the cabin air system.

In some embodiments, the aircraft may also include a pneumatic coupling system. The pneumatic coupling system may include a first valve coupled between the cabin air system and the gas turbine engine and a controller coupled to the first valve. The controller may be configured to automatically close the first valve and block compressed bleed air that may contain cleaning agent moving through the engine core from moving into the cabin air system in response to receipt of an input associated with a cleaning cycle.

In some embodiments, the pneumatic coupling system may include a user interface coupled to the controller. The user interface may be configured to send the input associated with a cleaning cycle to the controller.

According to another aspect of the present disclosure, a cleaning system may include an aircraft and a mobile supply unit. The aircraft may include an airframe, a gas turbine engine coupled to the airframe, and a starter air supply coupled to the airframe. The starter air supply may be sized to constantly dry motor the gas turbine engine for a predetermined starting cycle. The mobile supply unit may be movable relative to the aircraft. The mobile supply unit may include a cleaning agent supply adapted to provide cleaning agent to the gas turbine engine.

In some embodiments, the mobile supply unit may also include a cleaning air supply. The cleaning air supply may be sized to provide enough compressed air to constantly dry motor the gas turbine engine for a predetermined cleaning cycle. The cleaning cycle may be longer than the starting cycle.

In some embodiments, the aircraft includes a cabin air system, a pneumatic coupling system, and a controller. The pneumatic coupling system may be coupled between a cabin air system and the gas turbine engine. The controller may be configured to automatically adjust the pneumatic coupling system to block compressed bleed air that may contain cleaning agent moving through the gas turbine engine from moving into the cabin air system in response to receipt of an input associated with a cleaning cycle.

In some embodiments, the gas turbine engine may include a cleaning agent supply connector coupled to the cleaning agent supply by a hose and an engine core coupled to the cleaning agent supply connector to receive cleaning agent from the cleaning agent supply connector. The cleaning agent supply connector may be coupled to the controller and may be configured to send the input associated with a cleaning cycle to the controller in response to a cleaning agent supply being coupled to the cleaning agent supply connector.

In some embodiments, the pneumatic coupling system may be coupled between the cleaning agent supply connector and the engine core. The controller may be configured to automatically adjust the pneumatic coupling system to allow cleaning solution to move from the cleaning agent supply connector to the engine core in response to receipt of the input associated with a cleaning cycle.

In some embodiments, the pneumatic coupling system may include a user interface coupled to the controller. The user interface may be configured to send the input associated with a cleaning cycle to the controller.

According to another aspect of the present disclosure, a method of cleaning an aircraft engine is taught. The method may include coupling an external cleaning air supply to a gas turbine engine included in an aircraft and introducing a cleaning agent into the gas turbine engine.

In some embodiments, the method may include dry motoring the gas turbine engine for a predetermined cleaning cycle time. This dry motoring may be performed by conducting compressed air from the external cleaning air supply to the gas turbine engine.

In some embodiments, the method may include coupling a cleaning agent supply to a cleaning agent supply connector included in the gas turbine engine. The external cleaning air supply and the cleaning agent supply may be mounted to a transport vehicle for movement together relative to the aircraft.

In some embodiments, the aircraft may include a cabin air system, a pneumatic coupling system, and a controller. The pneumatic coupling system may be coupled between a cabin air system and the gas turbine engine. The controller may be configured to automatically adjust the pneumatic coupling system to block compressed bleed air that may contain cleaning agent moving through the gas turbine engine from moving into the cabin air system in response to receipt of an input associated with a cleaning cycle.

In some embodiments, the cleaning agent supply connector may be coupled to the controller and may be configured to send the input associated with a cleaning cycle to the controller in response to a cleaning agent supply being coupled to the cleaning agent supply connector. The pneumatic coupling system may be coupled between the cleaning agent supply connector and the engine core and the controller may be configured to automatically adjust the pneumatic coupling system to allow cleaning solution to move from the cleaning agent supply connector to the engine core in response to receipt of the input associated with a cleaning cycle.

In some embodiments, the method may include interacting with a user interface coupled to the controller. The user interface may be configured to send the input associated with a cleaning cycle to the controller These and other features of the present disclosure will become more apparent from the following description of the illustrative embodiments.

DETAILED DESCRIPTION OF THE DRAWINGS

Figure 1:
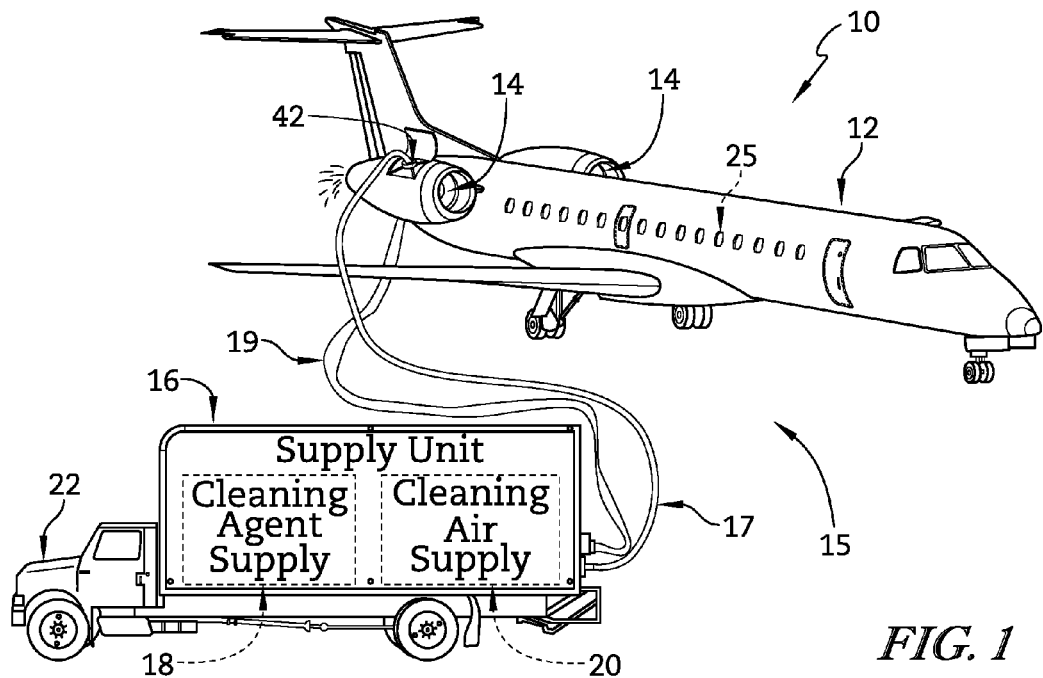
FIG. 1 is a perspective view of an aircraft and a mobile supply unit used to clean turbine engines included in the aircraft.

For the purposes of promoting an understanding of the principles of the disclosure, reference will now be made to a number of illustrative embodiments illustrated in the drawings and specific language will be used to describe the same.

An aircraft 10 illustratively includes an airframe 12 and turbine engines 14 as shown in FIG. 1. A mobile supply unit 16 may cooperate with the aircraft 10 to provide a cleaning system 15 used to clean the turbine engines 14 while they are mounted to the airframe 12. The mobile supply unit 16 is illustratively configured to introduce cleaning agent into one of the turbine engines 14 and to drive the turbine engine 14 to move the cleaning agent through the turbine engine 14 so that internal components of the turbine engine 14 are cleaned.

The mobile supply unit 16 illustratively includes a cleaning agent supply 18 and a cleaning air supply 20 mounted to a transport vehicle 22 as shown in FIG. 1. The cleaning agent supply 18 stores and provides cleaning agent to the turbine engine 14. The cleaning air supply 20 provides compressed air to the turbine engine 14 to drive dry motoring of the turbine engine 14, which draws cleaning agent through the turbine engine 14. For illustrative purposes, the mobile supply unit 16 is shown in the back of a truck; however, in other embodiments, the mobile supply unit 16 may be incorporated into a work cart, trailer, or the like.

Figure 2:
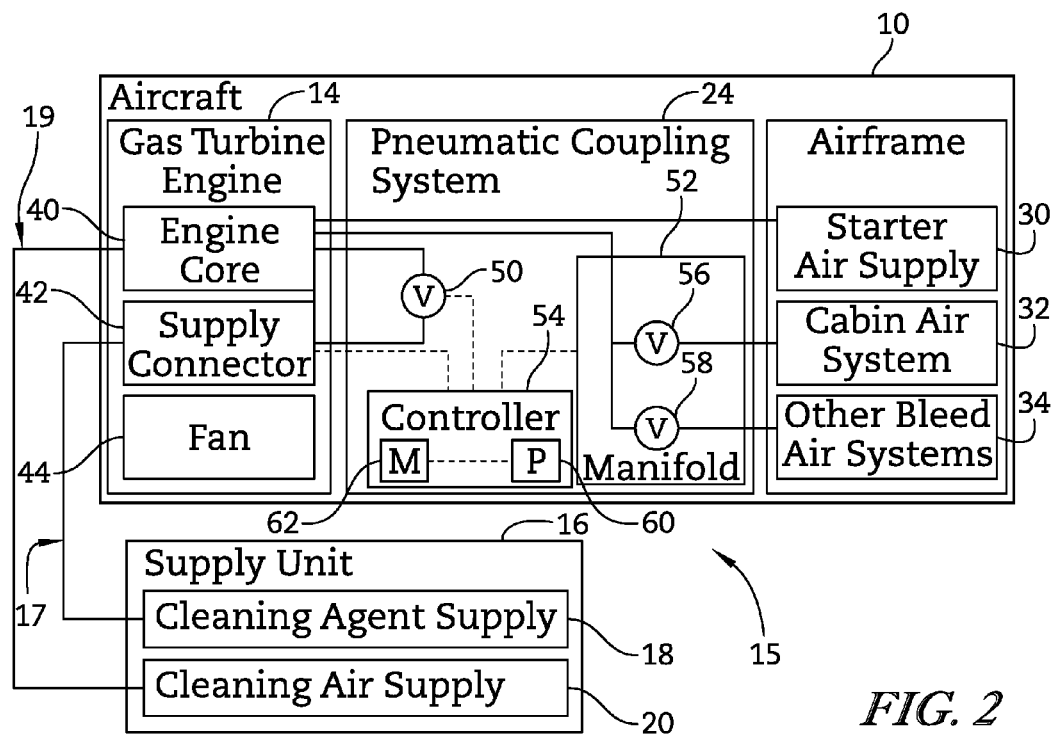
FIG. 2 is a diagrammatic view of the aircraft and mobile supply unit of FIG. 1 showing that a pneumatic coupling system included in the aircraft cooperates with the supply unit to provide a cleaning system.
Figure 3:
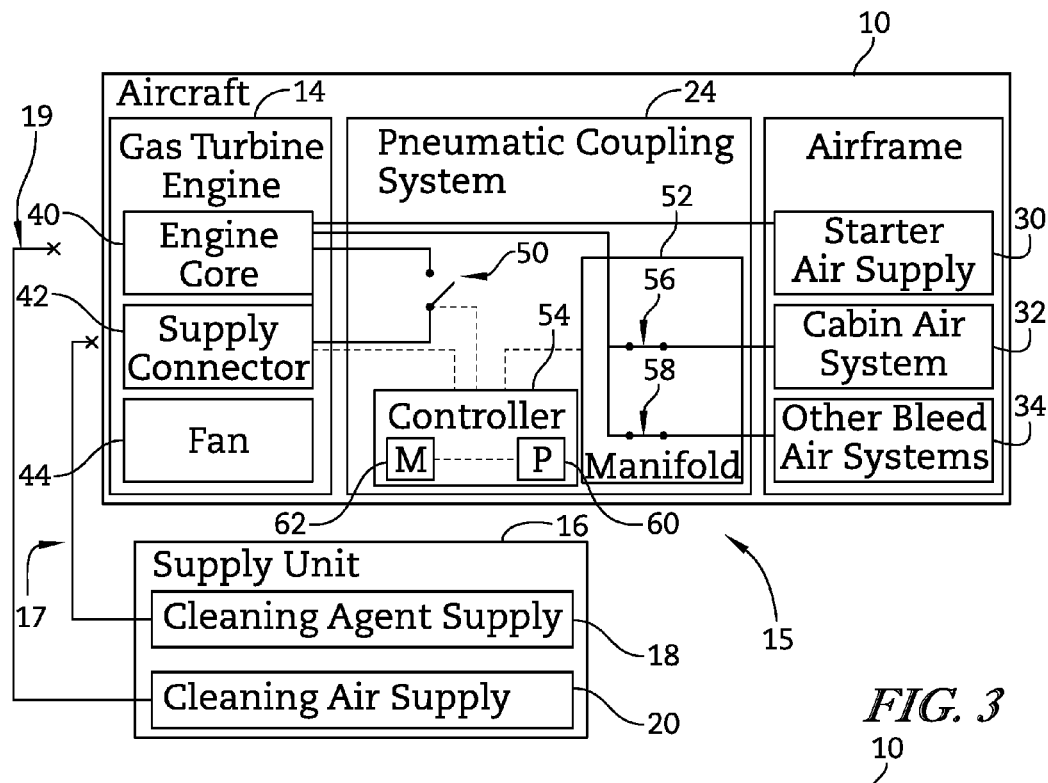
FIG. 3 is a diagrammatic view of the aircraft and mobile supply unit similar to FIG. 2 showing that airframe valves controlling air flow from the turbine engines to an airframe included in the aircraft are opened and that a cleaning valve controlling cleaning agent flow into a core of the turbine engine is closed before the supply unit is coupled to the turbine engine.

The aircraft 10 further includes a pneumatic coupling system 24 that interconnects the turbine engine 14 with the airframe 12 to conduct pressurized air from the turbine engine 14 to the airframe 12 as shown diagrammatically in FIG. 2. In the illustrative embodiment, the pneumatic coupling system 24 is configured to pneumatically disconnect the turbine engine 14 from the airframe 12 automatically when cleaning agent is introduced into the turbine engine 14 to block cleaning agent moving through the turbine engine 14 from being conducted into the airframe 12 so that moisture, unpleasant odors, and grime associated with the cleaning agent does not enter the airframe 12. In the illustrative embodiment, the airframe 12 of the aircraft 10 includes a starter air supply 30, a cabin air system 32, and other bleed air systems 34 as shown diagrammatically in FIG. 2. The starter air supply 30 provides compressed air to the turbine engine 14 to drive short-term motoring of the turbine engine 14 during start-up of the turbine engine 14. The cabin air system 32 receives pressurized air from the turbine engine 14 and pressurizes a passenger cabin 25 of the aircraft 10. The other bleed air systems 34 also receive pressurized air from the turbine engine 14 and use the air to perform various functions of the airframe 12. Examples of other bleed air systems 34 include air supply systems, fuel manifold systems, anti-ice systems, pressure regulation systems, and controller systems.

The turbine engines 14 provide thrust for the aircraft 10 and each illustratively includes an engine core 40, a supply connector 42, and a fan 44 as shown in FIG. 2. The engine core 40 burns fuel to drive the fan 44 and includes a compressor (not shown) from which pressurized air is bled off to supply the cabin air system 32 and the other bleed air systems 34. The supply connector 42 is adapted to be coupled to the cleaning agent supply 18 and is configured to conduct cleaning agent into the engine core 40. The supply connector 42 is illustratively arranged between the engine core 40 and the fan 42 so that cleaning agent introduced into the engine core 40 does not have to pass over the fan 44 such that the fan 44 might push some cleaning agent away from moving into the engine core 40. The fan 44 accelerates atmospheric air into and around the engine core 40 to create thrust.

The pneumatic coupling system 24 included in the aircraft 10 illustratively includes a cleaning valve 50, a bleed air manifold 52, and a controller 54 as shown diagrammatically in FIG. 2. The cleaning valve 50 is illustratively coupled pneumatically between the engine core 40 and the supply connector 42 to block or allow cleaning agent movement into the engine core 40 from the supply connector 42. The bleed air manifold 52 is illustratively coupled pneumatically between the engine core 40 and the airframe 12 to block or allow pressurized air movement into the airframe 12 from the engine core 40. The controller 54 is coupled to the cleaning valve 50, the bleed air manifold 52, and to the supply connector 42 to control the cleaning valve 50 and the bleed air manifold 52 based on inputs from the supply connector 42. In some embodiments, the pneumatic coupling system 24 may be wholly or partially integrated into the turbine engine 14 and/or the airframe 12.

The bleed air manifold 52 illustratively includes a first airframe valve 56 and a second airframe valve 58 as shown in FIG. 2. The first airframe valve 56 is coupled pneumatically between the engine core 40 and the cabin air system 32 to block or allow pressurized air from the engine core 40 into the cabin air system 32. The second airframe valve 58 is coupled pneumatically between the engine core 40 and the other bleed air systems 34 to block or allow pressurized air from the engine core 40 into the other bleed air systems 34.

The controller 54 illustratively includes a processor 60 and memory 62 coupled to the processor 60 as shown in FIG. 2. The processor 60 is of any suitable type and is configured to execute instructions stored in the memory 62. The memory 62 is illustratively of any suitable type and contains instructions associated with the operation of the cleaning valve 50 along with the airframe valves 56, 58 included in the air bleed manifold 52.

Figure 4:
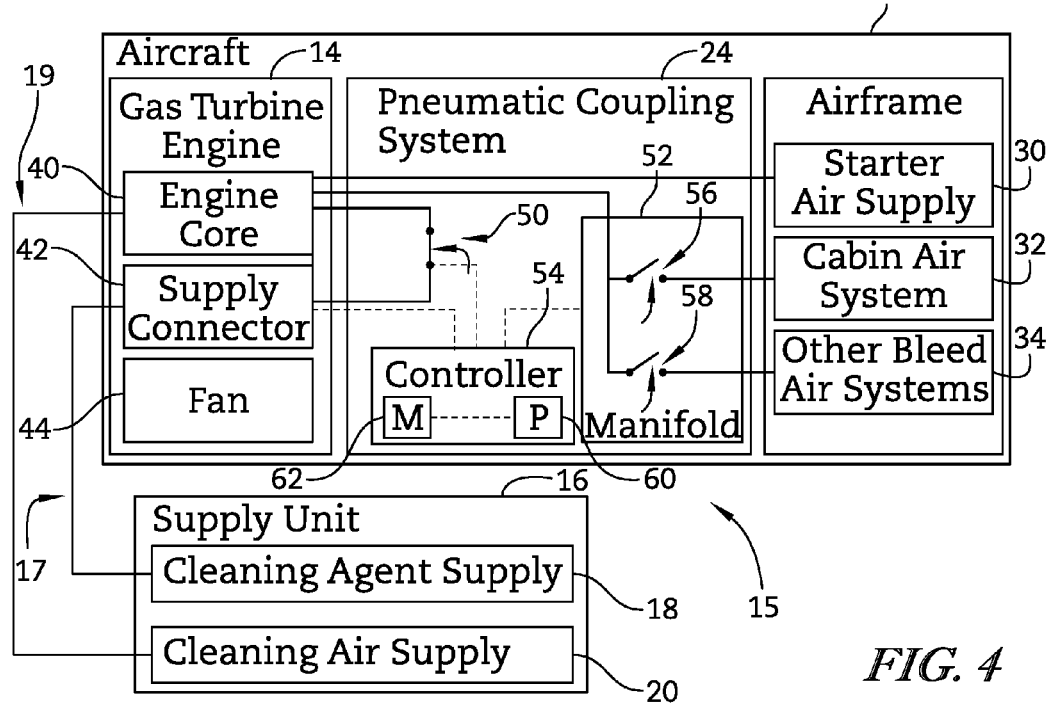
FIG. 4 is a view similar to FIG. 3 showing that airframe valves controlling air flow from the turbine engines to the airframe are automatically opened and that the cleaning valve controlling cleaning agent flow into the core of the turbine engine is opened in response to the supply unit being coupled to the turbine engine.

Based on illustrative instructions stored in the memory 62, the controller 54 is configured to close both the first and the second airframe valves 56, 58 and to open the cleaning valve 50 automatically ahead of a cleaning cycle as suggested in FIG. 4. More specifically, the controller 54 is configured to close both the airframe valves 56, 58 and to open the cleaning valve 50 in response to receiving a signal associated with a cleaning cycle. Accordingly, during a cleaning cycle, both the first airframe valve 56 and the second airframe valve 58 block movement of cleaning agent and pressurized air from the turbine engine 14 into the airframe 12.

In the illustrative embodiment, the controller 54 receives the signal associated with the cleaning cycle from the supply connector 42 upon connection of the cleaning agent supply 18 to the supply connector via a hose 17. In other embodiments, the cleaning cycle signal may be generated by other devices that may be connected to the controller 54.

Further, based on the instructions stored in the memory 62, the controller 54 is configured to open both the first and the second airframe valves 56, 58 and to close the cleaning valve 50 automatically after a cleaning cycle. More specifically, the controller 54 is configured to open both the airframe valves 56, 58 and to close the cleaning valve 50 in response to receiving a signal associated with normal operation of the aircraft 10. Accordingly, during normal operation of the aircraft 10, both the first airframe valve 56 and the second airframe valve 58 allow pressurized air from the turbine engine 14 into the airframe 12.

In the illustrative embodiment, the controller 54 receives the signal associated with normal operation from the supply connector 42 upon disconnection of the cleaning agent supply 18 from the supply connector. In other embodiments, the normal operation signal may be generated by other devices that may be connected to the controller 54.

The starter air supply 30 is internal to the aircraft 10 and is illustratively sized to constantly dry motor the turbine engine 14 for a predetermined starting cycle of about one (1) minute to five (5) minutes as needed during startup of the turbine engines 14. After the predetermined starting cycle, the starter air supply 30 requires an illustrative recharging or cooling period of about thirty (30) minutes to forty-five (45) minutes.

The cleaning air supply 20 is external to the aircraft 10 and coupled to the engine core 40 by a hose 19 as shown in FIG. 1. The cleaning air supply 20 is illustratively sized to constantly dry motor the turbine engine 14 for a predetermined cleaning cycle of about thirty (30) minutes to ninety (90) minutes as needed during cleaning of the turbine engines 14. The ability of the cleaning air supply 20 to dry motor the turbine engine 14 for the entire cleaning cycle without recharging or cooling may allow the total time required for engine cleaning to be reduced.

In the illustrative embodiment, the cleaning agent supply 18 is configured for use with foamed cleaning agents available from Matrix Scientific and Aerocore Technologies, both of Columbia, S.C., U.S.A. In other embodiments, the cleaning agent supply 18 may be used with other cleaning agents such as, in one example, deionized water. Additionally, the cleaning agent supply 18 may be used to conduct cleaning agent onto the fan 44 while the turbine engine 14 is dry motored to clean the fan 44. Cleaning agent may be sprayed onto the fan 44 from the cleaning agent supply 18 by a wand (not shown) before, during, and/or after introduction of cleaning agent directly into the engine core 40 through the supply connector 42 as part of a cleaning cycle.

Figure 5:
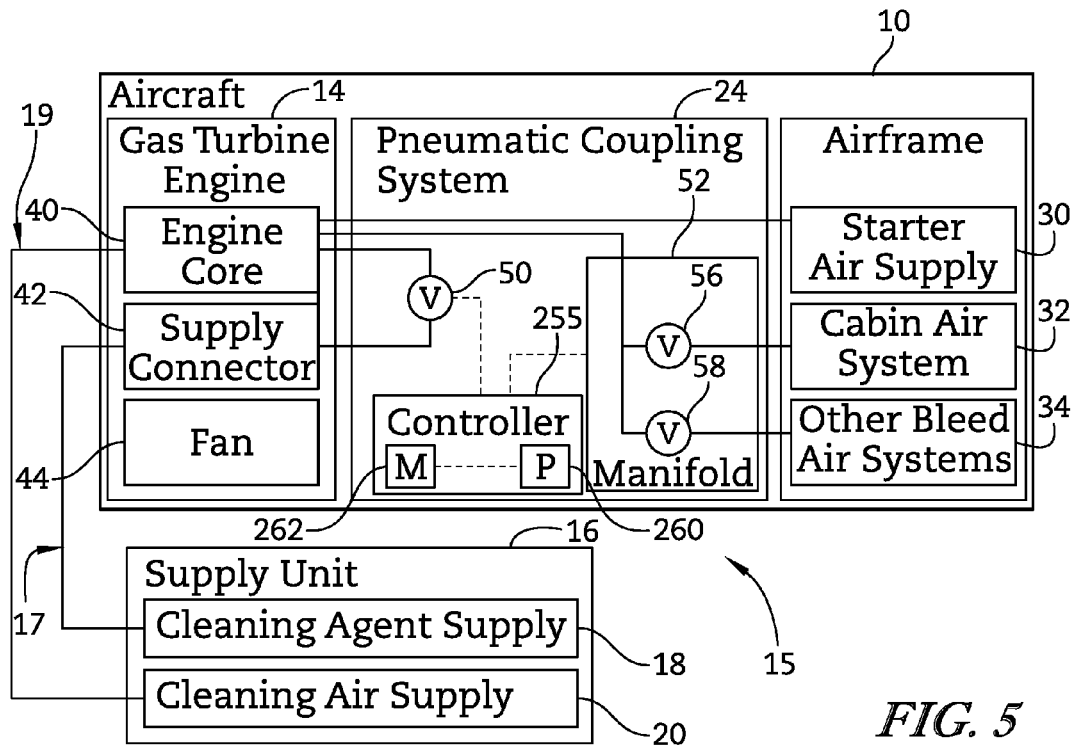
FIG. 5 is a diagrammatic view of a first alternative aircraft and mobile supply showing that a pneumatic coupling system included in the aircraft cooperates with the supply unit to provide a cleaning system that controls airframe valves based on the state of a cleaning valve.

Another illustrative controller 255 integrated into the pneumatic coupling system 24 of the aircraft 10 is shown diagrammatically in FIG. 5. The controller 255 illustratively includes a processor 260 and memory 262 coupled to the processor 260 as shown in FIG. 5. The processor 260 is of any suitable type and is configured to execute instructions stored in the memory 262. The memory 262 is illustratively of any suitable type and contains instructions associated with the operation of the cleaning valve 50 along with the airframe valves 56, 58 included in the air bleed manifold 52.

Unlike the controller 54, the controller 255 is not coupled to a supply connector 242 to receive signals associated with a cleaning cycle or normal operation from the supply connector. Rather, the controller 255 receives signals associated with the cleaning cycle or normal operation from the cleaning valve 50.

Based on illustrative instructions stored in a memory 263 included in the controller 255, the controller 255 is configured to close both the first and the second airframe valves 56, 58 and to open the cleaning valve 50 automatically ahead of a cleaning cycle in response to receiving a signal associated with the cleaning cycle from the cleaning valve 50. Illustratively, the controller 54 receives the signal associated with the cleaning cycle from the cleaning valve 50 upon opening of the cleaning valve 50. Accordingly, during a cleaning cycle, both the first airframe valve 56 and the second airframe valve 58 block movement of cleaning agent and pressurized air from the turbine engine 14 into the airframe 12.

Further, based on the instructions stored in the memory 62, the controller 255 is configured to open both the first and the second airframe valves 56, 58 and to close the cleaning valve 50 automatically after a cleaning cycle in response to receiving a signal associated with normal operation from the cleaning valve 50. Illustratively, the controller 54 receives the signal associated with normal operation from the cleaning valve 50 upon closing of the cleaning valve 50. Accordingly, during normal operation of the aircraft 10, both the first airframe valve 56 and the second airframe valve 58 allow pressurized air from the turbine engine 14 into the airframe 12.

Figure 6:
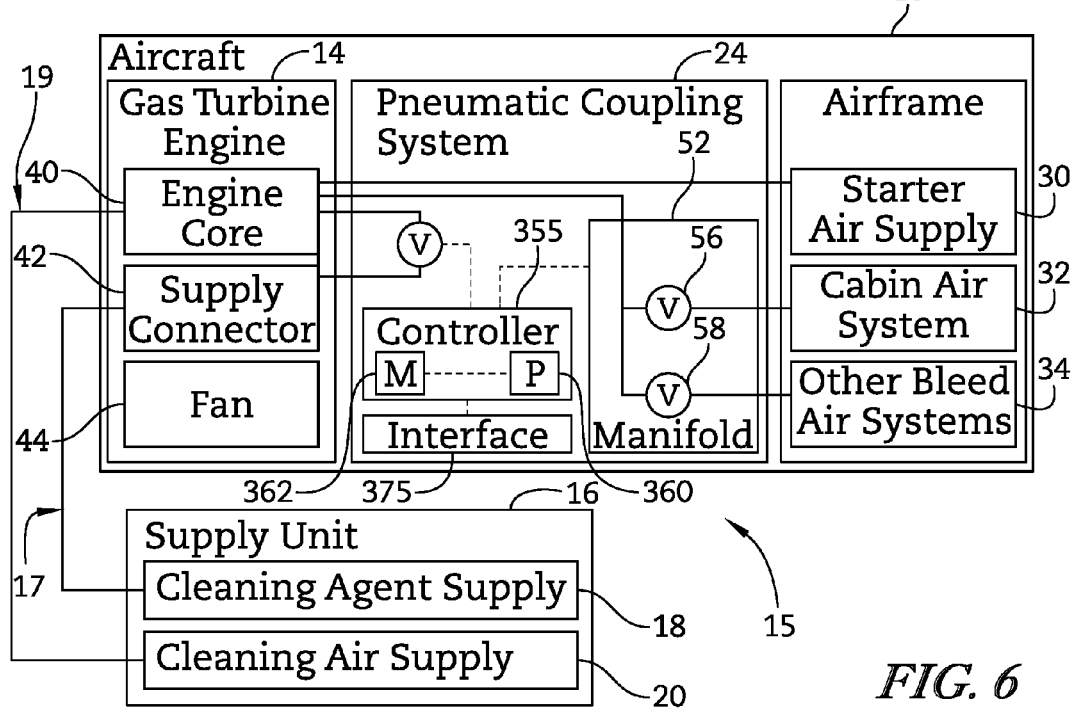
FIG. 6 is a diagrammatic view of a second alternative aircraft and mobile supply showing that a pneumatic coupling system included in the aircraft cooperates with the supply unit to provide a cleaning system that controls a cleaning valve and airframe valves based on inputs from a user interface.

Another illustrative controller 355 integrated into the pneumatic coupling system 24 of the aircraft 10 is shown diagrammatically in FIG. 5. The controller 355 illustratively includes a processor 360 and memory 362 coupled to the processor 360 as shown in FIG. 6. The processor 360 is of any suitable type and is configured to execute instructions stored in the memory 362. The memory 362 is illustratively of any suitable type and contains instructions associated with the operation of the cleaning valve 50 along with the airframe valves 56, 58 included in the air bleed manifold 52.

Unlike the controller 54, the controller 355 is not coupled to a supply connector 242 to receive signals associated with a cleaning cycle or normal operation from the supply connector. Rather, the controller 355 receives signals associated with the cleaning cycle or normal operation from a user interface 375. The user interface 375 may be button, a switch, a knob, a graphical user interface, or any other suitable input in communication with the controller 355. In some versions of this embodiment, the supply connector 42 and the cleaning valve 50 may be omitted and a wand may be used to introduce cleaning agent into the turbine engine 14.

Based on illustrative instructions stored in memory 362 included in the controller 355, the controller 355 is configured to close both the first and the second airframe valves 56, 58 and to open the cleaning valve 50 automatically ahead of a cleaning cycle in response to receiving a signal associated with the cleaning cycle from the cleaning valve 50. Illustratively, the controller 54 receives the signal associated with the cleaning cycle from the user interface 375 upon a first predetermined input from a user being detected by the user interface 375. Accordingly, during a cleaning cycle, both the first airframe valve 56 and the second airframe valve 58 block movement of cleaning agent and pressurized air from the turbine engine 14 into the airframe 12.

Further, based on the instructions stored in memory 362, the controller 355 is configured to open both the first and the second airframe valves 56, 58 and to close the cleaning valve 50 automatically after a cleaning cycle in response to receiving a signal associated with normal operation from the cleaning valve 50. Illustratively, the controller 54 receives the signal associated with normal operation from the user interface 375 upon a second predetermined input from a user being detected by the user interface 375. Accordingly, during normal operation of the aircraft 10, both the first airframe valve 56 and the second airframe valve 58 allow pressurized air from the turbine engine 14 into the airframe 12.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An aircraft comprising
a cabin air system,
a gas turbine engine including an engine core coupled to the cabin air system to provide compressed bleed air to the cabin air system and a cleaning agent supply connector coupled to the engine core to conduct a cleaning agent to the engine core, and
a pneumatic coupling system including a first valve coupled between the cabin air system and the engine core, a second valve coupled between the engine core and the cleaning agent supply connector, and a controller coupled to the first valve, the controller configured to automatically close the first valve and block compressed bleed air that may contain cleaning agent moving through the engine core from moving into the cabin air system in response to receipt of an input associated with a cleaning cycle.

2. The aircraft of claim 1, wherein the controller is coupled to the cleaning agent supply connector and the cleaning agent supply connector is configured to send the input associated with a cleaning cycle to the controller in response to a cleaning agent supply being coupled to the cleaning agent supply connector.

3. The aircraft of claim 2, wherein the controller is coupled to the second valve and the controller is configured to automatically open the second valve in response to receipt of the input associated with a cleaning cycle.

4. The aircraft of claim 1, wherein the controller is coupled to the second valve and the second valve is configured to send the input associated with a cleaning cycle to the controller in response to movement of the second valve from a closed position to an opened position.

5. The aircraft of claim 1, wherein the pneumatic coupling system includes a user interface coupled to the controller and the user interface is configured to send the input associated with a cleaning cycle to the controller.

6. A cleaning system comprising
an aircraft including an airframe, a cabin air system, a gas turbine engine coupled to the airframe, and a starter air supply coupled to the airframe, the starter air supply sized to constantly dry motor the gas turbine engine for a predetermined starting cycle, and
a mobile supply unit movable relative to the aircraft, the mobile supply unit including a cleaning agent supply adapted to provide cleaning agent to the gas turbine engine and a cleaning air supply sized to provide enough compressed air to constantly dry motor the gas turbine engine for a predetermined cleaning cycle, the cleaning cycle being longer than the starting cycle,
wherein the gas turbine engine includes an engine core coupled to the cabin air system to provide compressed bleed air to the cabin air system and a cleaning agent supply connector coupled to the engine core to conduct a cleaning agent to the engine core, and
wherein the aircraft includes a pneumatic coupling system including a first valve coupled between the cabin air system and the engine core, a second valve coupled between the engine core and the cleaning agent supply connector, and a controller coupled to the first valve, the controller configured to automatically close the first valve and block compressed bleed air that may contain cleaning agent moving through the engine core from moving into the cabin air system in response to receipt of an input associated with a cleaning cycle.

7. The cleaning system of claim 6, wherein the gas turbine engine includes a cleaning agent supply connector coupled to the cleaning agent supply by a hose and an engine core coupled to the cleaning agent supply connector to receive cleaning agent from the cleaning agent supply connector.

8. The cleaning system of claim 7, wherein the cleaning agent supply connector is coupled to the controller and is configured to send the input associated with a cleaning cycle to the controller in response to a cleaning agent supply being coupled to the cleaning agent supply connector.

9. The aircraft of claim 8, wherein the pneumatic coupling system coupled between the cleaning agent supply connector and the engine core and the controller is configured to automatically adjust the pneumatic coupling system to allow cleaning solution to move from the cleaning agent supply connector to the engine core in response to receipt of the input associated with a cleaning cycle.

10. The aircraft of claim 7, wherein the pneumatic coupling system includes a user interface coupled to the controller and the user interface is configured to send the input associated with a cleaning cycle to the controller.

11. A method of cleaning an aircraft engine, the method comprising
coupling an external cleaning air supply to a gas turbine engine included in an aircraft;
introducing a cleaning agent into the gas turbine engine; and
dry motoring the gas turbine engine for a predetermined cleaning cycle time by conducting compressed air from the external cleaning air supply to the gas turbine engine,
wherein the aircraft includes a cabin air system, the gas turbine engine, and a pneumatic coupling system,
wherein the gas turbine engine includes an engine core coupled to the cabin air system to provide compressed bleed air to the cabin air system and a cleaning agent supply connector coupled to the engine core to conduct a cleaning agent to the engine core, and
wherein the pneumatic coupling system includes a first valve coupled between the cabin air system and the engine core, a second valve coupled between the engine core and the cleaning agent supply connector, and a controller coupled to the first valve, the controller configured to automatically close the first valve and block compressed bleed air that may contain cleaning agent moving through the engine core from moving into the cabin air system in response to receipt of an input associated with a cleaning cycle.

12. The method of claim 11 further comprising coupling a cleaning agent supply to a cleaning agent supply connector included in the gas turbine engine.

13. The method of claim 12, wherein the external cleaning air supply and the cleaning agent supply are mounted to a transport vehicle for movement together relative to the aircraft.

14. The method of claim 11, wherein the cleaning agent supply connector is coupled to the controller and is configured to send the input associated with a cleaning cycle to the controller in response to a cleaning agent supply being coupled to the cleaning agent supply connector.

15. The method of claim 14, wherein the pneumatic coupling system coupled between the cleaning agent supply connector and the engine core and the controller is configured to automatically adjust the pneumatic coupling system to allow cleaning solution to move from the cleaning agent supply connector to the engine core in response to receipt of the input associated with a cleaning cycle.

16. The method of claim 11, further comprising interacting with a user interface coupled to the controller, wherein the user interface is configured to send the input associated with a cleaning cycle to the controller.

* * * * *